3,051,687
POLYURETHANE RESINS

Donald M. Young, Geneva, Switzerland, and Fritz Hostettler, Charleston, W. Va., assignors to Union Carbide Corporation, a corporation of New York
No Drawing. Filed Apr. 30, 1957, Ser. No. 655,966
22 Claims. (Cl. 260—77.5)

The present invention relates to synthetic compositions of matter useful in the manufacture of tires, shoe soles, belts and many other articles desirably having high resistance to abrasion, oxidation, solvents and ultraviolet light, as well as to a method of preparing such compositions.

This application is a continuation-in-part of our earlier application, Serial No. 577,951, filed April 13, 1956, in which we have described the prepartion of urethane resins of outstanding properties by isocyanate modification of lactone polyesters that in turn are prepared by reacting one or more lactones with one or more poly-functional initiators.

The lactones described in our earlier application as suitable starting materials for the preparation of the lactone polyesters are those containing at least six carbon atoms in the ring and corresponding to the general formula:

I.   

in which $n$ is at least four, at least $n+2$ R's are hydrogen, and the remaining R's are hydrogen, alkyl, cycloalkyl, alkoxy or single ring aromatic hydrocarbon radicals.

Among the initiators disclosed as suitable in our earlier applications are many diols, including not only low molecular weight glycols such as theylene and propylene glycols, but also relatively high molecular weight polyoxyalkylene gylcols of the formulae $HO(CH_2CH_2O)_nH$ and $HO[CH(CH_3)CH_2O]_nH$ where $n$ equals 1 to 40 and more generally polyoxyalkylated derivatives of compounds having two reactive hydrogen atoms which may contain primary or secondary hydroxyls, phenolic hydroxyls, mercapto, amido, sulfonamido or carboxyl groups and are obtainable by reacting (a) alkylene oxides such as ethylene oxide, propylene oxide, 1-butylene oxide, 2-butylene oxide, isobutylene oxide, butadiene monoxide, styrene oxide, or mixtures of these monoepoxides with (b) such compounds as (1) diols including polymethylene glycols $HO(CH_2)_nOH$ where $n$ equals 2 to 10, propylene glycol and 2,2'-thiodiethanol; (2) phenols including 4,4'-methylenediphenol, 4,4'-isopropylidenediphenol and resorcinol; (3) mercapto alcohols like 2-mercapto-ethanol; and (4) dibasic acids such as maleic, succinic, glutaric, adipic, pimelic, sebacic, phthalic hexahydrophthalic and oxy- and thiodivaleric; as well as polyoxyalkylated derivatives of such monoepoxides as tetrahydropyrane, tetrahydrofurane and trimethylene oxide having the general formula $HO[(CH_2)_nO]_xH$ in which $n$ is 3, 4 or 5.

Lactone polyesters are prepared by reaction of a diol with a molar excess of lactone as illustrated in the equation:

II.   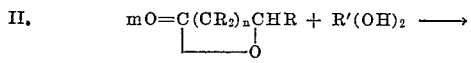

in which the sum of $x$'s is equal to $m$, the R's and $n$'s are as defined in Formula I and R' stands for the divalent diol residue.

In accordance with one preferred embodiment, these hydroxyl-terminated lactone polyesters represented for convenience by the symbol HO(PE)OH, are linearly extended and modified by a molar excess, preferably about 30 to 60%, or an organic diisocyanate as follows:

$HO(PE)OH$ + excess $G(NCO)_2$ 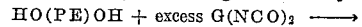

III.   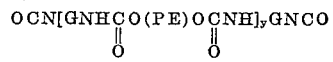

in which G stands for a divalent aliphatic, aromatic or cycloaliphatic radical, and $y$ is an average of at least one and preferably about two or more. The resulting polyester-polyurethanes, which are substantially linear units of conjugated divalent polyester chains and diisocyanate residues and preferably comprise at least two polyester chains and at least three diisocyanate residues recurring alternately, can be subjected to further chain-lengthening and some cross-linking by reaction with an excess of glycol, amine or amino alcohol to form a gum stock convertible into a cured elastomer of excellent physical characteristics by final reaction with about 3 to 7% polyisocyanate.

Other embodiments include admixing the polyester withy glycol, amine or amino alcohol before reaction with isocyanate in the preparation of the gum stock, reaction of the glycol, etc. with isocyanate before reacting the adduct with polyester, varying the relative proportions of the reactants to obtain special effects, and selecting various reactants, and combinations thereof, to achieve particular characteristics.

We have found that among the glycols referred to in our earlier application as initiators in the first stage of polyurethane resin formation, the higher molecular weight polyoxyalkylene glycols, particularly those having molecular weights upwards of about 300 form, upon reaction with one or more lactones, oxyalkylene-carbooxyalkylene ploymers which in turn are converted by appropriate isocyanate-modification, cross-linking and curing, into polyurethane resins having outstanding low temperature properties as evidenced by their low brittle temperatures as well as excellent tensile strength and abrasion resistance.

These polyurethane resins are characterized by the presence of substantially linear units of conjugated divalent oxyalkylene-carbooxyalkylene chains and diisocyanate residues in which the chains and residues are connected to one another by means of urethane groups. The oxyalkylene-carbooxyalkylene chains comprise substantially linear series of interconnected divalent oxyalkylene and monocarbooxyalkylene links. The oxyalkylene links each comprise a terminal oxy (—O—) group and an alkylene segment including a terminal carbon atom and at least one intermediate carbon atom. The carbooxyalkylene links each comprise a terminal carbooxy (—COO—) group, and an alkylene segment including a terminal carbon atom and an intermediate chainlet of our carbon atoms. The terminal oxy and carbooxy groups of the links are connected to the terminal carbon atoms of next adjacent links.

In the preferred elastomeric resins, the oxyalkylene-carbooxyalkylene chains and diisocyanate residues recur alternately in the substantially linear units. A substantial proportion of the alkylene segments in a chain corresponds to the alkylene groups in the initial polyoxyalkylene glycol. These alkylene segments are, therefore, connected to one another by uninterrupted series of oxy groups. The remaining alkylene segments, corresponding to the lactone initially used, are connected to one another by carbooxy groups. Thus, for example, a typical chain in a resin of this type may be represented by:

IV.   

in which the E's stand for alkylene segments derived from polyoxyalkylene glycol and the L's stand for alkylene segments derived from a lactone.

It will be appreciated that the higher the molecular weight of the initial polyoxyalkylene glycol is, the more influence it, and particularly the repeated oxy groups thereof, will exert upon the properties of the lactone-polyoxyalkylene glycol adduct and in turn upon the properties of the ultimate polyurethane gum stocks and resins. It is believed, therefore, to be more accurate to refer to such adducts as oxyalkylene-carbooxyalkylene polymers rather than lactone polyesters to give due recognition to the presence and substantial influence of the oxy groups, which may well outnumber the carbooxy groups. In addition, for reasons that will become apparent, it is desirable to refer to an adduct formed by initiating polymerization of a lactone with a polyoxyalkylene glycol as a "block" oxyalkylene-carbooxyalkylene polymer or still more accurately as a mixture of "block" oxyalkylene-carbooxyalkylene polymers to indicate that the adduct comprises chains in which sizeable terminal blocks of carbooxy alkylene links derived from lactone are separated from one another by an intermediate block of oxyalkylene links derived from a polyoxyalkylene glycol, as shown in the formula:

V.

In preparing such block oxyalkylene-carbooxyalkylene polymers, we prefer to utilize lactones having the general formula shown in Formula I, i.e., at least six carbon atoms in the ring, and the higher molecular weight polyoxyalkylene glycols described in our earlier filed applications.

The lactones that are particularly suitable are unsubstituted epsilon-caprolactone and epsilon-caprolactones substituted by up to three lower alkyl groups on the carbon atoms of the lactone ring. The preparation of unsubstituted epsilon-caprolactone, in which the R's of Formula I are all hydrogen, is well-known. Substituted epsilon-caprolactones, and mixtures thereof, are available by conversion of various substituted cyclohexanones, as described in copending application Serial No. 548,754, filed November 23, 1955. The cyclohexanones may be obtained from substituted phenols or by other convenient synthetic routes.

Among the polyoxyalkylene glycols referred to, those having one of the formulae:

VI. 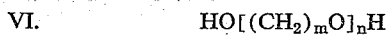

and

VII. 

in which $m$ is a number ranging from 2 to 5 and $n$ is a number ranging from about 1 to 40, are preferred.

To initiate the reaction of lactone with polyoxyalkylene glycol and to continue the addition of further lactone in order to form a mixture of block oxyalkylene-carbooxyalkylene polymers in the manner illustrated in Equation II, the lactone and the polyoxyalkylene glycol are preferably heated to a temperature between about 120 and 200° C. in order to achieve a practical and desirable rate of reaction with a minimum of decomposition. The temperature may be considerably lower however, i.e., as low as about 50° C., at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50 to 300° C. is considered operable and a more limited range between about 120 and 200° C. is considered preferable.

The formation of the block oxyalkylene-carbooxyalkylene polymers may be, and preferably is, accelerated by including minor amounts, ranging from as low as 0.001% to as high as about 0.5% by weight, of catalyst in the reaction mixture. A wide variety of catalysts may be employed for this purpose. These include particularly basic and neutral, as well as acidic, ester interchange catalysts.

The basic and neutral ester interchange catalysts, which are preferred because they have no tendency to form a non-reactive site in the oxyalkylene-carbooxyalkylene polymer molecules, include the metals lithium, sodium, potassium, rubidium, caesium, magnesium, calcium, barium, strontium, zinc, aluminum, cobalt, titanium, germanium, tin, lead, antimony, arsenic and cerium, as well as the alkoxides thereof, the carbonates of the alkali- and alkaline earth metals, organic tin oxides and titanates, titanium chelates and acylates, litharge, zinc oxide, antimony trioxide, germanium dioxide, cerium trioxide, cobaltous acetate, zinc borate and lead salts generally.

Monocarboxylic acids, which have catalytic activity in opening the lactone ring and promoting reaction thereof with the terminal hydroxyl of a polyoxyalkylene or of a lactone residue already added thereto, are not preferred because they tend to acylate the reactive terminal hydroxyl groups. The acids that are operable, however, include acetic acid and other aliphatic monocarboxylic acids up to and including hexanoic acid as well as derivatives thereof such as 2-ethylhexanoic acid. It is recommended, if a monocarboxylic acid is used as a catalyst, that it be used in amounts within the lower portion of the range specified, i.e., in an amount of the order of 0.001% and not exceeding about 0.5% by weight.

Dicarboxylic acids, such as succinic, maleic, glutaric, adipic, sebacic, and phthalic acids, may also be used to catalyze the reaction, although they tend to introduce carboxyl end-groups into the oxyalkylene-carbooxyalkylene polymers. Among other suitable catalysts are hydrochloric acid, surfuric acid, phosphoric acid, zinc chloride, aluminum trichloride, tin dichloride, tin tetrachloride, and boron trifluoride. However, when strongly acidic components are employed as catalysts, the reaction temperature should preferably be kept low, e.g., as 50 to 150° C., in order to prevent excessive dehydration during the reaction. Furthermore, it is advantageous to neutralize acidic catalysts prior to conducting reaction stage two.

The duration of the lactone-polyoxyalkylene glycol reaction varies from about a few minutes to about a week depending upon the lactone or mixtures of lactones selected, the glycol, the reaction temperature and the catalyst, if one is present. If it is desired to obtain a product of superior color, then it is preferable to conduct the reaction in the absence of oxygen. This may be accomplished, for example, by operating in a partial vacuum or in the presence of an inert gas such as nitrogen, which may be passed through the reaction mixture. After formation of the oxyalkylene-carbooxyalkylene polymers is complete, any unreacted monomer may be removed by applying a vacuum thereto at elevated temperature, e.g., a vacuum of 1 to 5 mm. mercury at 120 to 160° C.

It is apparent from Equation II that the preparation of the oxyalkylene-carbooxyalkylene polymers in the first stage of the method of this invention has the unique advantage of permitting accurate control over the average molecular weight of the oxyalkylene-carbooxyalkylene polymers, and further of promoting the formation of a substantially homogeneous mixture of oxyalkylene-carbooxyalkylene polymers in which the molecular weights of the individual molecules are substantially all very close to the average molecular weight. This control, as is evident from Equation II, is obtained by preselecting the molar proportions of lactone and glycol in a manner that will readily be appreciated by those skilled in the art. Thus, for example, if it is desired to form a mixture of block oxyalkylene-carbooxyalkylene polymers in which the average molecular weight is approximately 2000 from a polyoxyalkylene glycol having a molecular weight of 860 and unsubstituted epsiloncaprolactone (molecular weight=114), the molar proportions of lactones to glycol utilized in the preparation are fixed at approximately 10:1. It is to be expected that on the average each mol of glycol will add on an approximately equal number of lactones and an average of ten lactone molecules would be available to each glycol molecule.

We have also found that polyurethane resins can advantageously be prepared from oxyalkylene-carbooxyalkylene polymers in which the oxy and carbooxy groups, or oxyalkylene and carbooxyalkylene links, are distributed in random or ordered fashion along the lengths of the chains and that these can be prepared essentially by reaction of a lactone with an epoxide and a difunctional focal compound in the presence of a catalyst.

The polyurethane resins of this embodiment are likewise characterized by the presence of substantially linear units of conjugated oxyalkylene-carbooxyalkylene chains and diisocyanate residues in which the chains and residues are connected to one another by means of urethane groups and the chains comprise substantially linear series of interconnected divalent oxyalkylene and monocarbooxyalkylene links. In the chains of these resins, however, the connecting oxy and carbooxy groups between the alkylene segments are distributed in ordered or random fashion. Thus, for example, a typical chain with ordered distribution may be represented by:

VIII. 
—OLCOEOEOLCOEOEOLCOEO ... etc.

and a typical chain with random distribution would be:

IX. 
—OEOLCOEOEOEOLCOLCOEOEO ... etc.

in which the E's now stand for alkylene segments derived from an epoxide.

The lactones that are suitable for use in preparing oxyalkylene-carbooxyalkylene polymers in accordance with this embodiment of the invention are the same as those described with reference to Formula I and in addition include delta-valerolactones and gamma-butyrolactones. The general formula for the lactones suitable in this embodiment of the invention is therefore:

X. 

in which $n$ is at least two, all the R's are hydrogen when $n$ is two, at least six R's are hydrogen when $n$ is more than two, and the remaining R's are hydrogen, alkyl, cycloalkyl, alkoxy or single ring aromatic hydrocarbon radicals.

The epoxides that are useful as starting materials in this embodiment of the invention are the monomeric vicinal epoxides of the general formula:

XI. 

in which the R'''s are hydrogen, alkyl, chloralkyl, hydroxyalkyl, vinyl or phenyl radicals or in which the two R'''s form a closed hydrocarbon ring. Among the monomeric vicinal epoxides of this description that deserve special mention are ethylene oxide, propylene oxide, 1-methyl-1,2-propylene oxide, 1,2-butylene oxide, butadiene monoxide, epichlorohydrin, glycidol, cyclohexene oxide and styrene oxide. Mixtures of these epoxides are also suitable and in some instances most highly desirable from the point of view of providing a ready means of altering the properties of the oxyalkylene-carbooxyalkylene polymers that are formed. Ethylene and propylene oxides, and mixtures thereof, are preferred because of their low cost and ease of reaction.

The difunctional focal compounds, so-called because they act as focal points in the formation of oxyalkylene-carbooxyalkylene polymers of this type and play a major role in determining the molecular weight of a given mixture of oxyalkylene-carbooxyalkylene polymers, are those having two reactive hydrogens that are capable of opening a lactone ring or an epoxide. Typical among compounds useful as such are diols, diamines, diphenols, dimercaptans, amino alcohols and mercapto alcohols represented by the formula:

XII. $R'''(YH)_2$ in which $R'''$ is an aliphatic, cycloaliphatic, aromatic or heterocyclic radical and the Y's are —O—, —S—, —NH— and —NR''''—, R'''' being a hydrocarbon radical selected from the group consisting of alkyl, aryl, aralkyl and cycloalkyl radicals. Diols are preferred.

The difunctional compounds that are suitable include aliphatic diols such as glycols of the general formula $HO(CH_2)_nOH$ in which $n$ equals two to ten, alkylene ether glycols of the formulae $HO[(CH_2)_mO]_nH$ and $HO[CH(CH_3)CH_2O]_nH$ in which $m$ is from two to five and $n$ is one to about ten, 2,2-dimethyl-1,3-propanediol, 2,2-diethyl-1,3-propanediol, 3-methyl-1,5-pentanediol, N-methyl- and N-ethyl diethanolamines; cycloaliphatic diols such as various cyclohexanediols, 4,4'-methylene-biscyclohexanol, 4,4'-isopropylidenebiscyclohexanol; aromatic diols such as hydroquinol; aromatic-aliphatic diols such as various xylenediols, hydroxymethyl-phenethyl alcohols, hydroxymethyl-phenylpropanols, phenylenediethanols, phenylenedipropanols; and various heterocyclic diols such as 1,4-piperazine diethanol; difunctional amino alcohols such as aliphatic amino alcohols of the general formula $HO(CH_2)_nNH_2$, where $n$ equals two to ten, N-methylethanolamine, isopropanolamine, N-methylisopropanolamine; aromatic amino alcohols such as para-aminophenethyl alcohol and para-amino-alpha-methylbenzyl alcohol; various cycloaliphatic amino alcohols such as 4-aminocyclohexanol; diamines of the general formula $H_2N(CH_2)_nNH_2$, monosecondary diamines of the general formula $R''''NH(CH_2)_nNH_2$, and disecondary diamines of the general formula $$R''''NH(CH_2)_nNHR''''$$

where $n$ equals two to ten and where $R''''$ is alkyl, aryl, aralkyl or cycloalkyl; aromatic diamines such as meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3' - dimethyl-4,4'-biphenyldiamine, 3,3' - dimethoxy-4,4'-biphenyldiamine, 3,3'-dichloro-4,4'-biphenyldiamine, 4,4'-methylenedianiline, 4,4'-ethylenedianiline, 2,3,5,6-tetramethyl - para - phenylenediamine, 2,5-fluorenediamine, and 2,7-fluorenediamine; and cycloaliphatic diamines such as 1,4-cyclohexanediamine, 4,4'-methylenebiscyclohexylamine, and 4,4'-isopropylidenebiscyclohexylamine; and heterocyclic amines such as piperazine, 2,5-dimethylpiperazine and 1,4-bis(3-aminopropyl)-piperazine, as well as corresponding dithiols and mercaptoalcohols. Water and hydrogen sulfide are also suitable as difunctional compounds for initiating a lactone-epoxide reaction.

The oxyalkylene-carbooxyalkylene polymers prepared from these starting materials in accordance with this embodiment of the method of the invention are believed to correspond predominantly to the general formula:

XIII. 
$$H[(OE)_x(OLC)_m]_yYR'''Y[(CLO)_m(EO)_x]_yH$$

in which the Y's and $R'''$ are as defined earlier, and the L's are substantially linear lactone residues or alkylene segments having the general formula —$(CR_2)_nCHR$— in which $n$ and the R's are as described with reference to Formula X, the E's are 1,2-epoxide residues or alkylene segments having the general formula:

XIV. —CH—CH—
 | |
 R'' R'' wherein the R'''s are as described with reference to Formula XI, the m's are an average of at least one, the x's average from about one-half to about six and one-half, the y's average from about one to about fifty, and the L's and E's are in random or ordered distribution, at least some of the L's in a given series being recurrent, i.e., separated from one another by E's, or at least some of the E's in a given series being recurrent, i.e., separated from one another by L's.

While we do not wish to be limited by any theory presented herein, it is believed that the lactone and epoxide molecules are opened in the course of the reaction to form substantially linear carbooxyalkylene and oxyalkylene links, respectively, i.e., substituted or unsubstituted alkylene segments having terminal carbooxy and oxy groups. The opening of one such lactone or epoxide molecule produces a chain link having a terminal hydroxyl group which can then open another lactone or epoxide molecule. This produces a lengthening of the chain and the formation of still another hydroxyl for again opening a lactone ring or epoxide bridge. Additional lactone and epoxide residues add on in random or ordered fashion to form a chain of recurrent lactone residues and epoxide residues, said chain in essence comprising a series of alkylene links connected to one another by divalent carbooxy groups and oxy groups.

To illustrate, it is believed that a lactone is opened by reaction with a hydroxyl group and thus converted into an alkylene segment connected by a carbooxy group at one end to a diol residue, for example, and by an oxy group at the other end to a terminal hydrogen, thus:

XV.

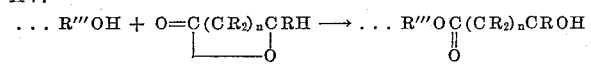

or

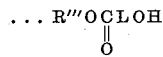

If more lactone molecules are available, they will form and add to previous links in the same manner. Epoxides are also opened by hydroxyl groups to form ethylene segments. Thus, for example, the ethylene oxide will react with a terminal OH group:

XVI.

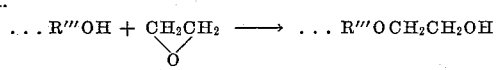

or

If more epoxide molecules are available, they will add to previous groups in the same manner, forming polyoxyethylene chains. When a lactone and an epoxide are both available, they are believed to react in essentially the same manner and add in random fashion to form polyoxyalkylene chains interrupted occasionally by carbooxy groups.

It is to be understood and emphasized, therefore, that the L's and E's in Formula XIII, for example, can be in random or ordered distribution and that the formula represents the predominant structure of the oxyalkylene-carbooxyalkylene polymers. The values of $m$ and $x$ in the individual

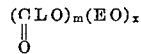

chain portions may be the same or different and the lengths and structures of the various

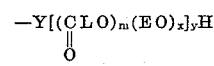

chains need not be the same. The $y$ of one chain may in fact equal zero, in which instance the formula may be more specifically expressed as:

XVII.

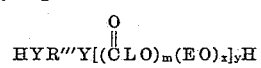

The distribution of the L and E groups in the oxyalkylene-carbooxyalkylene polymers is such that a lactone residue may occur at either or both ends of a chain and an epoxide residue may likewise occur at either or both ends of a series. The general formula is therefore intended to include structures that may more specifically be set forth as having chains of the formulae:

XVIII.

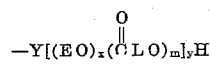

XIX.

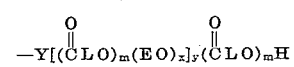

and

XX.

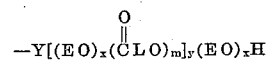

It will also be apparent that there are at least three methylene groups in any opened lactone residue symbolized by L in the formulae and further identified as adjoining at least one carbonyl group of a connecting carbooxy group. The opened epoxide residues symbolized in the formulae by E and further identified as positioned between oxy groups, some of which may be connected to carbonyl groups to form carbooxy links, contain two methylene groups. Where substituted lactones and substituted 1,2-epoxides are used, the alkylene segments of the respective opened residues will be correspondingly substituted.

When water is used in place of organic polyfunctional compounds, the reactions are essentially the same. With hydrogen sulfide, lactones are believed to add on:

XXI.

or

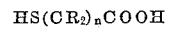

and epoxides would open and add:

XXII.

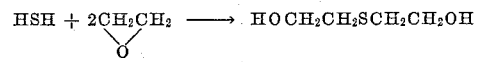

Additional lactones and epoxides would be opened and add to the chains in the manner described.

A preferred and most direct method of preparing the oxyalkylene-carbooxyalkylene polymers in the first stage, provided the difunctional focal compounds chosen do not contain nitrogen atoms carrying reactive hydrogen atoms, is to react the three initial materials described, i.e., the lactone, the epoxide and the difunctional compound, at an elevated temperature in the presence of a catalyst. By way of illustration, the reaction of ethylene glycol, unsubstituted epsiloncaprolactone and ethylene oxide in accordance with this embodiment of the invention may, for example, be represented by the equation:

XXIII.

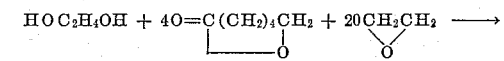

the ethylene and pentamethylene segments, and therefore also the oxy and carbooxy groups, however being distributed in random fashion within the brackets and the $y$'s being an average of two.

The distribution of the lactone and epoxide residues within the oxyalkylene-carbooxyalkylene polymers can, as a practical matter, be influenced to a considerable extent by a selection of the temperature at which the starting materials are reacted and the rate at which the reactants are fed to the reaction mixture, although theoretically an efficient distribution is possible at any temperature up to about 150 to 200° C. Generally, lower alkylene epoxides react more rapidly with hydroxyl groups than do the lactones. With increasing molecular weight, epoxides react more slowly, and approach the reaction rates of the lactones.

At lower temperatures, i.e., from about 10° C. to about 70° C., maximum intermixing of the lactone and epoxide residues is favored because then the rate at which the lactones react with the hydroxyl groups is slow enough to permit relatively accurate correlation therewith of the rate of addition of epoxide to the reaction mixture. Furthermore, the heat of the exothermic reactions can be removed more effectively at slower reaction rates, thus minimizing acceleration of the reaction rates due to increases in temperature. Thus, for example, if under the conditions of reaction five mols of lactone could be expected to add onto terminal hydroxyls in the course of five minutes, it would be relatively easy to obtain an oxyalkylene-carbooxyalkylene polymer having chain segments alternately and repeatedly having an average of two epoxide residues and one lactone residue by mixing the lactone with the hydroxyl-bearing compound, adding ten mols of epoxide in the course of five minutes and cooling the reaction mixture to keep the temperature, and therefore the reaction rates, relatively constant. This type of oxyalkylene-carbooxyalkylene polymer, in which the random distribution of the epoxide and lactone residues is relatively efficient, is characterized by water-insolubility and by not crystallizing even at temperatures as low as −30° C.

At higher temperatures, e.g., from about 70 to 100° C. or higher, the rates of reaction are considerably faster and the difficulty of removing the heat of the reactions for controlling the temperature of reaction are multiplied. As a result, such higher temperatures favor a less efficient distribution of the lactone and epoxide residues with the result that an oxyalkylene-carbooxyalkylene polymer chain will contain a relatively large number of epoxide residues connected to one another in series and such series of epoxide residues are interrupted occasionally by series of lactone residues. Thus, for example, where the epoxide to lactone ratio is 2:1, an oxyalkylene-carbooxyalkylene polymer chain obtained at such a higher temperature and feed rate of epoxide may have an average of twenty or thirty epoxide residues connected in seriatim to one another and such series of epoxide residues may be interrupted or terminated by fairly long series or blocks of polylactones having an average of ten or fifteen lactone residues. This type of oxyalkylene-carbooxyalkylene polymer, in which the random distribution of epoxide and lactone residues is relatively inefficient, is characterized by water-solubility and a tendency to crystallize at temperatures of the order of 10 to 15° C.

It will be understood, therefore, that with this knowledge of the reactivity rates of epoxides relative to one another and relative to lactones, and the influence thereon of temperature conditions, suitable adjustments can readily be made to influence the reactions in desired directions and, therefore, the characteristics of oxyalkylene-carbooxyalkylene polymers and resins prepared therefrom.

Higher temperatures within the operable range of about 10° C. to 150 or 200° C., e.g., above about 100° C., are feasible provided the contact time is made correspondingly short so as to avoid dehydration side reactions, particularly when the catalyst is boron trifluoride. Lower temperatures, e.g., as low as 10° C., are operable but require longer reaction times than are considered economically desirable. Generally, therefore, elevated temperatures up to about 100° C. are preferred and temperatures between about 50 and 70° C. are considered optimum for maximum production and control with minimum dehydration.

The reaction is preferably promoted by the presence of Lewis acids such as the trifluoride, tribromide and trichloride of boron, the bromides and chlorides of aluminum, tin and titanium, and the chlorides of antimony, beryllium, bismuth, cadmium, gallium, iron, uranium, zinc and zirconium. The preferred catalysts are boron trifluoride and its complexes with such organic compounds as ethers, alcohols and polyols.

When the oxyalkylene-carbooxyalkylene polymers are prepared in this manner, it is essential to use, as initiators for the polycondensation thereon of lactone and epoxide residues, difunctional focal compounds that do not contain nitrogen atoms for the reason that the Lewis acid catalysts employed in the reaction form inactive complexes with nitrogen atoms. When a flexible resin is the ultimate desideratum, it is advantageous to avoid using lactones that are substituted on the carbon atom adjoining the oxy group of the lactone, e.g., the epsilon carbon of an epsilon-caprolactone. Use of such lactones when a boron trifluoride complex is the catalyst apparently causes dehydration of the second hydroxyl group that is formed and then results in a branched-chain structure of high hydroxyl content that is desirable when the ultimate product is to be a rigid product.

The preparation of the oxyalkylene-carbooxyalkylene polymers in the first stage of the method of the invention can also be accomplished in three steps to result in a relatively ordered distribution of oxy and carbooxy groups. The first of these steps involves reacting the initial lactone or mixture of lactones with a molar excess of a monohydric alcohol as indicated in the equation:

XXIV.

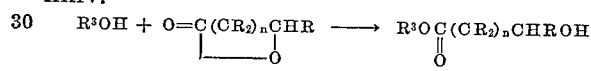

or

The reaction product of this step is then reacted with one or more monomeric vicinal epoxides, as illustrated in the equation:

XXV.

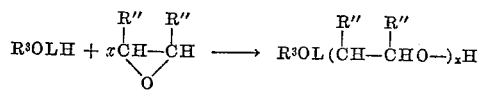

or

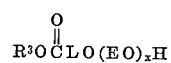

Finally, the resulting oxycarbooxyalkylene monomer is reacted with an excess of difunctional focal compound acting as a chain stopper, the reaction with a diol being illustrated by the equation:

XXVI.

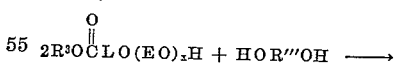

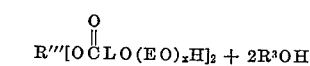

and the residual product self-polymerizes by interaction of its terminal hydroxyls with the interior ester groups and the elimination of excess difunctional compound:

XXVII.

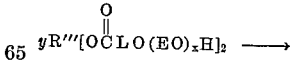

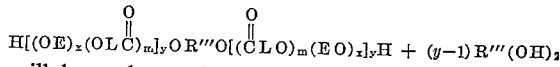

It will be understood, of course, that an amino group on the chain stopper will result in a carbamido linkage between an oxyalkylene-carbooxyalkylene chain and the chain stopper residue.

The alcohol used in the first step of this embodiment of the invention and symbolized in the equation as R³OH is a primary or secondary monohydric alcohol having a lower boiling point than the difunctional chain stopper. Among those suitable for this purpose are aliphatic alcohols such as methanol, ethanol, propanol, isopropanol, 1-butanol, 2-butanol, tert.-butanol, 1-pentanol, 2-pentanol, tert.-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol. Methyl and ethyl alcohols are preferred.

The lactones that are suitable as starting materials in the first step are the same as those previously identified by Formula X. The lactones having less than six carbon atoms in the ring, i.e., where $n$ is less than four, can be used in accordance with this embodiment of the method even though homopolyesters thereof tend to revert to the monomer at elevated temperatures and therefore do not form stable products. They are suitable here because the addition of as little as one mol of a monomeric vicinal epoxide per mol of lactone results in the preparation of linear oxyalkylene-carbooxyalkylene polymers in which reversion to small rings is excluded. While it is true that with some of the lower molecular weight lactones somewhat less than 100%, i.e., about 80% and in some instances as low as 60%, conversion takes place, the oxyalkylene-carbooxyalkylene polymers from these lower molecular weight lactones are nevertheless entirely suitable for the purposes of the invention.

The first step in this more indirect manner of preparing the oxyalkylene-carbooxyalkylene polymers is preferably carried out at a temperature of the order of about 60 to 100° C. and in the presence of acidic ester interchange catalysts such as sulfuric, hydrochloric, phosphoric acids and boron trifluoride complexes such as trifluoride ethyl etherate. Basic and neutral ester interchange catalysts that also promote the reaction include such metals as lithium, sodium, potassium, rubidium, caesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.01 and about 0.5% by weight based on the total charge are suitable. The preferred range is from 0.05 to 0.2%.

In order to obtain an optimum proportion of the hydroxy ester, it is important to utilize a considerable excess, e.g., five to twenty mols of alcohol per mol of lactone. Thus, for example, by working with a ten-fold excess of alcohol, 60 to 95% of the lactone employed is converted to the hydroxy ester. The remainder consists either of unreacted lactone or of higher alcohol adducts, i.e., compounds in which two or more lactone residues are joined to an alcohol to form a higher molecular weight hydroxy ester. It is quite possible, however, to proceed with a somewhat smaller excess of alcohol and thereby obtain a hydroxy polyester adduct in which the average number of lactone residues added to the alcohol is in excess of one.

After the formation of the hydroxy ester has been completed, the excess alcohol present in the reaction mixture must be removed. This is most conveniently accomplished by distillation at temperatures as high as 100° C. However, since the ester interchange catalysts used in this step to open the lactone ring also catalyze the reformation of alcohol and lactone, in some instances fairly rapidly at temperatures as low as 50° C., it is necessary to remove or to destroy the catalyst before removal of the excess alcohol. Acidic and basic catalysts such as sulfuric acid and sodium methoxide can easily be converted to inactive salts by neutralization, or they can readily be removed completely by means of ion exchange resins. If, however, the catalyst for the first step is destroyed by formation of an active salt, e.g., sodium sulfate, the hydroxy esters formed in the reaction of the first step must be distilled off because otherwise such salts would interfere with the catalytic process of the second step. Neutral ester interchange catalysts, while plentiful and operable, are difficult to remove or to destroy and are therefore not preferred.

In the second step of the alternative method for preparing the oxyalkylene-carbooxyalkylene polymers, the hydroxy esters formed in the first step are reacted with monomeric vicinal epoxides in the presence of a catalyst to form lengthened hydroxy esters containing ether groups. The epoxides that are suitable in this step are those that have already been described as corresponding to Formula XI. Mixtures of these epoxides are also suitable and in some instances preferred for desirably altering the structure of the oxyalkylene-carbooxyalkylene polymers. Ethylene and propylene oxide and mixtures thereof are preferred because of their low cost and ease of reaction.

The catalysts that are most suitable for the second step are the Lewis acids named earlier, particularly boron trifluoride and the complexes thereof with organic compounds as well as aluminum trichloride, zinc chloride and tin chloride. Bases such as tertiary organic amines, sodium and potassium methoxides and hydroxides may also be employed although they are considered not as suitable because they require relatively high reaction temperatures of the order of 90 to 150° C. and high catalyst concentrations of the order of 0.2 to 2% in order to be effective. Thus, while these other catalysts are operable, they are not preferred because of the high temperatures and catalyst concentrations that are necessary and which tend to promote reversion of the hydroxy esters to the initial lactones and alcohols. Boron trifluoride complexes such as the ethyl etherate are preferred.

The operable range of reaction temperatures for the second step of this alternative method is from below about 10° C. to about 150° C. At the lower temperatures in this range the reaction proceeds slowly, while at higher temperatures there is danger of ring closure of the hydroxy ester with formation of lactone and alcohol. The preferred temperature range is from 45 to 100° C. since it allows rapid reaction rates with a minimum of reversion to the lactone.

Any unreacted lactone from the first step that remains at the beginning of the second step will take part in the reaction with the 1,2-epoxide when a Lewis acid catalyst is employed. The amount of such lactone reacting in the second step depends upon the duration and the temperature of the reaction, the catalyst concentration as well as on the structure of the lactone and the epoxide used.

The oxy-carbooxyalkylene monomers obtained in accordance with the second step are polymerized in the third step with the aid of a difunctional focal compound acting as a chain stopper to form linear oxyalkylene-carbooxyalkylene polymers of any desired preselected molecular weight. Difunctional focal compounds acting as chain stoppers in this alternative method of preparation yield linear polymers, as they do when used as initiators in the more direct process described earlier.

The difunctional focal compounds that are suitable as chain stoppers in the third step of this alternative method are generally the diols, diamines and amino alcohols represented by Formula XII.

It is important, from the point of view of exercising control over the molecular weight of the oxyalkylene-carbooxyalkylene polymers, to use a considerable excess, preferably about five- to ten-fold the amount stoichiometrically required, of difunctional focal compound in the third step and that it be one having a higher boiling point than the alcohol used in the first step. This excess and higher boiling point is required in order to insure a substantial displacement of the monofunctional alcohol from the intermediate product of the second step. In instances in which the focal compound itself is difficult to remove, e.g., when a considerably higher boiling diol is employed, the preferred procedure is to use a stoichiometric amount thereof in conjunction with a substantial excess of another diol that is relatively easy to remove. Thus, for example, where the alcohol used in the first step is methanol and the desired chain stopper is triethylene glycol, it is possible by this procedure to remove substantially completely all of the methanol with a considerable excess of added ethylene glycol and preferentially to retain in the polymer the stoichiometric amount of triethylene glycol initially used rather than the ethylene glycol.

The third step in the alternative method of preparing the oxyalkylene-carbooxyalkylene polymers in the first stage is preferably, but not necessarily, carried out with the use of a catalyst such as a basic or neutral ester interchange catalyst to accelerate the reaction. Among the catalysts that are suitable for this purpose are such metals as lithium, sodium, potassium, rubidium, caesium, magnesium, calcium, barium, strontium, zinc, aluminum, titanium, cobalt, germanium, tin, lead, antimony, arsenic and cerium, as well as the alk-oxides thereof. Additional suitable catalysts are, by way of example, zinc borate, lead borate, zinc oxide, lead silicate, lead arsenate, litharge, lead carbonate, antimony trioxide, germanium dioxide, cerium trioxide, magnesium acetate, cobaltous acetate, manganese acetate, lead acetate, lead 2-ethylhexoate, lead salicylate and lead benzoate. Catalyst concentrations between about 0.001 and 1.0%, based on the weight of the starting monomer, are suitable. The preferred range is from 0.01 to 0.5%. The catalyst has also the function of destroying the boron trifluoride complex left in the reaction mixture of the preceding step, which, if not inactivated, may cause side reactions such as dehydration.

The catalysts that are particularly effective, and therefore preferred, in polymerizing the monomers are the organic tin compounds described in copending application Serial No. 577,952, the organic titanium compounds described in copending application Serial No. 577,950, and the titanium chelates and acylates described in copending application Serial No. 577,954, all filed April 13, 1956.

The third step is carried out within the temperature range of 120 to 250° C., most effectively between about 150 and 200° C. It is preferably carried out in two phases, the first at a temperature of about 120 to 170° C. and the later phase, for further polymerization, at 150 to 250° C. At temperatures below 150° C. the reaction rate is relatively slow where as at temperatures above 200° C. there is a danger that thermal degradation of the reactants and products may begin to occur. It is desirable, therefore, to carry out the final phase of the third step under a vacuum and to exclude air from the reactants by blowing an inert gas such as nitrogen through the reaction mixture.

The average molecular weight and reactivity of the mixture of oxyalkylene-carbooxyalkylene polymers with an isocyanate can readily be determined by analysis for hydroxyl and carboxyl content. The acid or carboxyl number (mg. of KOH per gram of oxyalkylene-carbooxyalkylene polymer using phenol-phthalein as an indicator) is a measure of the number of terminal carboxyl groups. The hydroxyl number, which is a measure of the number of terminal hydroxyl groups and is defined in terms of mg. of KOH per gram of oxyalkylene-carbooxyalkylene polymer, is determined by adding pyridine and acetic anhydride to the oxyalkylene-carbooxyalkylene polymer and titrating the acetic acid formed with KOH. The sum of the acid or carboxyl number and the hydroxyl number, referred to as the reactive number, is an indication of the average number of terminal groups present in the oxy- alkylene-carbooxyalkylene polymer and therefore is in turn an indication of the degree of polymerization. A mixture of oxyalkylene-carbooxyalkylene polymers containing long chain molecules will have a relatively low reactive number while oxyalkylene-carbooxyalkylene polymers containing short chains will possess relatively higher reactive numbers. Molecular weight can readily be calculated from the hydroxyl and carboxyl number by the formula:

XXVIII. $$M.W. = \frac{2000 \times 56.1}{OH\ No. + COOH\ No.}$$

It will become apparent from the foregoing that regardless of how the linear oxyalkylene-carbooxyalkylene polymers are made, i.e., whether they are block oxyalkylene-carbooxyalkylene polymers or whether the distribution of carbooxy and oxy groups in the chain is random or ordered, they can be "tailor-made" to best suit the particular type and requirements of the polyurethane resin ultimately desired. The molecular weight of block oxyalkylene-carbooxyalkylene polymers can be controlled accurately by a preselected proportion of the difunctional focal compounds reacted with the lactone and the epoxide or retained in the oxyalkylene-carbooxyalkylene polymers. The smaller the amount of initial glycol or difunctional focal compound is relative to the lactone or to the lactone and the epoxide, as the case may be, the higher will be the molecular weight of the oxyalkylene-carbooxyalkylene polymer. The relative proportions of oxy and carbooxy groups can readily be controlled by the proportions of lactone to glycol or epoxide. Oxyalkylene-carbooxyalkylene polymers prepared primarily from epsilon-caprolactone and ethylene oxide to have molecular weights of the order of about 1800 to 2800 and in which the oxy groups outnumber the carboxy groups by ratios of the order of about 3.2:1 to 6.5:1 are from slightly to completely water-soluble whereas those in which the ratio of oxy to carbooxy groups is of the order of about 0.5:1 to about 3.2:1 are water-insoluble liquids. The extent to which the occurrence of oxy and carbooxy groups is random or ordered can be influenced by the availability of the components for reaction in the course of preparation. This in turn can be controlled by selections of reaction temperature and rate of feed of epoxide to the reactants. Side chains can be introduced by the use of substituted lactones, substituted glycols or epoxides, or both. If desired, the oxyalkylene-carbooxyalkylene polymers can also be given a branched structure by employing polyols having a functionality higher than two in the preparation of block oxyalkylene-carbooxyalkylene polymers and by the use of diepoxides or polyfunctional focal compounds having more than two reactive hydrogens, or both, in the preparation of oxyalkylene-carbooxyalkylene polymers with random or ordered distribution of oxy and carbooxy groups.

We prefer to select the lactones and the glycols or epoxides and difunctional focal compound, and their relative proportions, so as to produce oxyalkylene-carbooxyalkylene polymers having molecular weights in the range of about 400 to as high as about 10,000 and preferably between about 1800 and 2800. When oxyalkylene-carbooxyalkylene polymers having molecular weights as low as about 400 are employed in the preparation of polyurethane resins by reaction with isocyanates, the resins formed are relatively rigid. On the other hand, oxyalkylene-carbooxyalkylene polymers having molecular weights in the upper end of the range, e.g., around 5000 to 7000, result in the formation of polyurethane resins of very high elasticity. Generally speaking, polyurethane resins prepared from block-type oxyalkylene-carbooxyalkylene polymers of a given molecular weight tend to form polyurethane resins having somewhat higher tensile strength than those formed from random or ordered type of oxyalkylene-carbooxyalkylene polymers of equal molecular weight.

As a further guide to the selection of initial reactants and their relative proportions for the formation of oxyalkylene-carbooxyalkylene polymers and their eventual conversion into polyurethane resins, it is well to bear in mind also that oxyalkylene-carbooxyalkylene polymers derived from unsubstituted lactones generally tend to have superior tensile strength and some tendency to crystallize, whereas those made from oxyalkylene-carbooxyalkylene polymers derived from substituted lactones, at least in part, show no tendency to crystallize and tend to form elastomers having optimum non-hardening properties. Inasmuch as the block-type oxyalkylene-carbooxyalkylene polymers tend to impart maximum tensile strength to polyurethane resins formed from them and oxyalkylene-carbooxyalkylene polymers having random or ordered distribution of oxy and carbooxy groups favor good low temperature properties, it will become apparent that optimum tensile strength is obtainable by use of block-type oxyalkylene-carbooxyalkylene polymers prepared from unsubstituted lactones as the only lactones and that optimum low temperature properties are obtainable by use of oxyalkylene-carbooxyalkylene polymers of the random or ordered type prepared, at least in part, from substituted lactones.

It is to be understood of course that the term "oxyalkylene-carbooxyalkylene polymers," as used herein, is intended to include not only the oxyalkylene-carbooxyalkylene polymers prepared by reaction of a single lactone with a single glycol or of a single lactone with a single epoxide and difunctional focal compound, but also those involving two or more lactones, glycols, epoxides or focal compounds. Furthermore, it is to be understood that it is within the scope of the invention to react diisocyanates with not only one particular mixture of oxyalkylene-carbooxyalkylene polymers but also with blends of different oxyalkylene-carbooxyalkylene polymer mixtures prepared as herein described as well as with blends of one or more of the oxyalkylene-carbooxyalkylene polymers with polyesters heretofore described, e.g., the lactone polyesters described in our earlier filed application Serial No. 577,950, filed April 13, 1956, or high molecular weight polyalkylene ethers or polyesters such as those prepared by condensation of a glycol with a dicarboxylic acid.

SECOND STAGE
*(Linear Extension)*

We have found it advantageous to extend the oxyalkylene-carbooxyalkylene polymers by reacting, after careful removal of any traces of moisture, their terminal hydroxyl groups with an excess of diisocyanate, as represented by the equation:

XXIX.

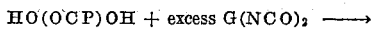
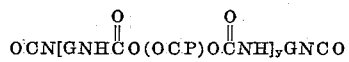

in which HO(OCP)OH is an abbreviated representation for the oxyalkylene-carbooxyalkylene polymers with their characteristic terminal hydroxyl groups and chains of divalent alkylene links connected by oxy and carbooxy groups, G stands for a member selected from the group consisting of divalent aliphatic, aromatic and cycloaliphatic radicals and $y$ is an average of at least one and preferably about two or more.

It will be noted from Equation XXIX that the use of an excess of diisocyanate provides an efficient means of control over the degree of linear extension of the oxyalkylene-carbooxyalkylene polymers. If the proportions of oxyalkylene-carbooxyalkylene polymer and diisocyanate are chosen so that the number of reactive terminal hydroxyl groups on the oxyalkylene-carbooxyalkylene polymers are equal to the number of reactive isocyanate groups on the diisocyanate, extremely long, high molecular weight chains would be formed with alternately recurring oxyalkylene-carbooxyalkylene chains and diisocyanate residues, $y$ in that instance possibly being a very high number. The resulting resin would have a sharp melting point, retain its original solubility properties, and be capable of being drawn into filaments. By utilizing an optimum excess of about 30 to 60% diisocyanate however, close control is maintained over the length of the isocyanate-modified oxyalkylene-carbooxyalkylene polymer in that the molecules formed predominantly comprise two to three oxyalkylene-carbooxyalkylene chains conjugated with three to four, respectively, diisocyanate residues, $y$ being an average of 3.33 with a diisocyanate excess of 30% and an average of 1.66 with a diisocyanate excess of 60%. Diisocyanate-modified oxyalkylene-carbooxyalkylene polymers within this range have the most desirable characteristics for the production, at a later stage, of a rubbery polymer which softens gradually over a wide range of temperatures and is not subject to cold drawing. A greater excess, up to several hundred percent, of diisocyanate is desirable if the desideratum is a more rigid type of polyurethane product.

The reaction of the oxyalkylene-carbooxyalkylene polymers with the diisocyanate can take place at temperatures varying from room temperature to above 300° C. The preferred temperature is in the range of about 100 to 150° C., the upper limit of the reaction temperature being selected on the basis of the thermal stability of the reaction products and of the diisocyanates, and the lower limit being determined by the lowest economical rate of reaction without a catalyst. At temperatures under this range, the reaction is entirely feasible if a catalyst is employed. Without a catalyst it is slow to be practicable, especially at temperatures below about 75° C. At temperatures above 200° C., and particularly above about 300° C., there is danger of destructive decomposition of the reactants and reaction product.

The time of reaction may vary from several minutes to as much as a day depending upon the reaction temperature and the identity of the particular oxyalkylene-carbooxyalkylene polymer and diisocyanate as well as upon the absence or presence of the accelerator or retarder and the identity thereof. Most desirably, conditions are adjusted so as to provide a controllable reaction that is completed in about ten to sixty minutes.

If desired, the reaction may be accelerated by employing catalysts such as inorganic bases and particularly tertiary organic bases such as tertiary amines and phosphines. Among the latter are N,N'-dimethylaniline, N,N'-dimethylhexahydroaniline, N,N'-dimethylpiperazine, N-methylmorpholine, tribenzylamine, N,N-dimethylbenzylamine, triethylamine, trialkyl phosphines, dialkylphenyl phosphines, alkyldiphenyl phosphines, etc. Catalyst concentrations may be varied considerably. Concentrations between about .001 and .5%, based on the weight of the total ingredients, have been found sufficient.

Among the retarders suitable for the oxyalkylene-carbooxyalkylene polymer-diisocyanate reaction are acids such as hydrochloric acid, sulfuric acid, phosphoric acid, boric acid, and organic acids; acyl halides such as acetyl chloride and acetyl bromide; sulfonyl halides such as para-toluene-sulfonyl-chloride; inorganic acid halides such as phosphorous tribromide, phosphorous trichloride, phosphorous oxychloride, sulfuryl chloride, and thionyl chloride; and sulfur dioxide or acidic sulfones. The addition of a retarder is desirable in some instances not only in order to slow down, as the name implies, the rate of reaction between terminal hydroxyl and isocyanate groups, but also for inhibiting reaction between the isocyanate groups and the urethane groups formed in the second stage.

If the starting oxyalkylene-carbooxyalkylene polymers from the first stage contain alkaline reacting materials, they should be neutralized or acidified slightly by addition of acids or acid chlorides. For instance, polyethylene oxides are prepared by catalyzing the ethylene oxide polymerization with sodium or potassium hydroxide or other basic catalysts. If these polyethylene oxides are reacted with lactone, the resulting block-type oxyalkylene-carbooxyalkylene polymers contain some sodium or potassium carboxylate end-groups which are efficient catalysts for the isocyanate reaction in stage two. In order to prevent almost instantaneous or premature cross-linking in stage two (a procedure which yields inferior elastomers), the oxyalkylene-carbooxyalkylene polymers should be neutralized or slightly acidified.

The chain lengthening reaction of the oxyalkylene-carbooxyalkylene polymers with the diisocyanate may be carried out with a wide variety of aliphatic, cycloaliphatic or aromatic diisocyanates, the aromatic diisocyanates being most suitable because of their greater reactivity. Among the various diisocyanates useful in this reaction are m- and p-phenylene diisocyanates, 2,4- and 2,6-tolylene diisocyanates, 2,3,5,6-tetramethyl-para-phenylene diisocyanate, m-xylylene diisoccyanate, 4,4'-biphenylene diisocyanate, 3,3'-dimethyl-4,4'-biphenylene diisocyanate, 3,3'-dimethoxy-4,4'-biphenylene diisocyanate, p,p'-bibenzyl diisocyanate, p,p'-diphenylmethane diisocyanate, 4,4'-methylene bis ortho tolyl isocyanate, 1,5-naphthalene diisocyanate, fluorene diisocyanates, pyrene diisocyanates, chrysene diisocyanates, etc. The table in the publication of Siefken (Annalen, 562, pages 122–135 (1949)) lists numerous other diisocyanates which are useful for performing this reaction.

THIRD STAGE

*(Gum Stock Preparation)*

In order to further extend the oxyalkylene-carbooxyalkylene polymer-polyurethane diisocyanates obtained in the second stage and also to bring about a cross-linking of the molecules, the oxyalkylene-carbooxyalkylene polymer-polyurethane is reacted with a polyfunctional, preferably a difunctional reactant. Such a further chain lengthening reaction to form a gum stock is illustrated, by way of example, in Equation XXX below. In this illustrative example, two mols oxyalkylene-carbooxyalkylene polymer-polyurethane diisocyanate, abbreviated for purposes of clarity as OCN(OCP—PU)NCO to indicate the reactive terminal isocyanate groups obtained by using an excess of diisocyanate in stage two, react with three mols of an amino alcohol to show the reactions of hydroxyl and amino groups of a difunctional reactant with the isocyanate groups.

XXX.

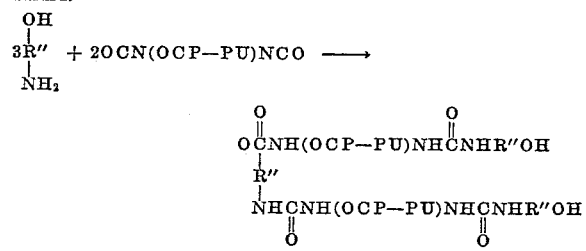

It will be evident from Reaction XXX that the hydroxyl group of a difunctional reactant in this stage reacts with a terminal isocyanate group to form a urethane group —OOCNH— and that the amino group of a difunctional reactant does so by forming a urylene group —HNCONH—. There is reason to believe that, simultaneously with Reaction XXX, the reaction products of Reaction XXX and free diisocyanates react to effect a cross-linking. These reactions can take place in many ways. Thus, for example, a terminal isocyanate group can react with a reactive hydrogen of (a) an amide group of a stage two product (Equation XXIX) prepared initially with a polyalkylene ether having one or two amino groups to form an acyl urea cross link, (b) a urethane group of a stage two product or a stage three product (Equation XXX) to form an allophanic ester cross link, and (c) a urylene group of a stage three product prepared with an amino group-containing reactant to form a biuret cross link. Some of these reactions may also take place, albeit at a much reduced rate, before the addition of a polyfunctional reactant in the third stage, because of the formation of a number of urethane groups in the second stage and their ability to enter into slow cross linking reaction with terminal isocyanate groups.

The reactant with which the oxyalkylene-carboxy-alkylene polymer-polyurethane diisocyanate from the second stage is reacted in this stage is preferably a difunctional compound such as a glycol, an amino alcohol, or a diamine. It is entirely within the scope of the method of the invention, however, to utilize in this stage higher functional reactants having three or even more reactive hydroxyl or amino groups and furthermore to utilize such reactants as water and others containing carboyxlic acid groups.

Substantially all of the difunctional reactants that are useful in the first stage are also useful in this stage. It is inadvisable, however, where high tensile strength of the final product is desirable, to use those of higher weight than, for example, polyoxyalkylene compounds of the formulae $HO(CH_2CH_2O)_nH$ and $$HO[CH(CH_3)CH_2O]_nH$$

where $n$ is greater than about six. Among the difunctional reactants found to be particularly suitable alone or in admixture with one another in this stage are ethylene glycol, trimethylene glycol, 1,4-butynediol, 1,4-butenediol, tetramethylene glycol, pentamethylene glycol, hexamethylene glycol, decamethylene glycol, quinitol, ethanolamine, 3-aminopropanol, 4-aminobutanol, 5-aminopentanol, 6-aminohexanol, p-aminobenzyl alcohol, m-amino-alpha-methylbenzyl alcohol, p-aminophenylethyl alcohol, ethylenediamine, trimethylenediamine, tetramethylenediamine, pentamethylenediamine, hexamethylenediamine, decamethylenediamine, m-phenylenediamine, 2,4-tolylenediamine, p-phenylenediamine, 4,4'-biphenylenediamine, 3,3'-dichloro-4,4'-biphenylenediamine, 3,3'-dimethyl-4,4'-biphenylenediamine, 3,3'-dimethoxy-4,4'-biphenylenediamine, p,p'-bibenzyldiamine, p,p'-diphenylmethanediamine, 2,5- and 2,7-fluorenediamines, 3,8- and 3,10-pyrenediamines, piperazine, various methyl-, and polymethylpiperazines. Difunctional reactants of this type are preferred in this stage of the process for the reason that they act as chain extenders without forming carbon dioxide in the mass.

Where elasticity of the gum stock and final resin is not an object and rigidity is permissible or desirable, it is feasible to employ in this stage higher molecular weight difunctional reactants and such polyfunctional materials as polyols and polyamines, e.g., 1,2,4-butanetriol, 1,2,6-hexanetriol, glycerol, trimethylolpropane, trimethylolethane, pentaerythritol, diethanolamine, diisopropanolamine, 2-(2-aminoethylamino)ethanol, diethylenetriamine, and triethylenetetramine.

Such agents as water and carboxylic acid are also operable where preparation of a storable gum stock is not required and in instances in which it is considered feasible to remove, by milling or otherwise, foam-producing carbon dioxide bubbles formed by reaction of these agents with unreacted isocyanate groups.

While Reaction XXX is shown, for illustrative purposes only, as involving three mols of a difunctional reactant and two mols of a oxyalkylene-carbooxyalkylene polymerpolyurethane diisocyanate, i.e., a 50% excess of a difunctional reactant, the amount of difunctional employed for optimum results is within the range of 1 to 20% excess. The use of more than 20% excess results in a system that is generally more rigid than desirable for the production of elastomeric materials and the use of an equivalent or less than equivalent amount of difunctional results in a completely cross-linked system which ceases to be a gum stock. It is to be understood, therefore, that while a 1 to 20% excess of difunctional reactant is recommended for the third stage, departures from this amount in order to obtain more rigid or more completely cross-linked systems are not outside the scope of the invention.

The reaction of the oxyalkylene-carbooxyalkylene polymer-polyurethane diisocyanate with polyfunctional reactant can be carried out at a temperature ranging from room temperature to over 200° C. Temperatures of the order of 100 to 150° C. are preferred. The time of reaction may vary from several minutes to one day depending upon the reaction temperature. If a catalyst has been employed in the second stage, it will also act as a catalyst in the third stage.

FOURTH STAGE
(Cure)

The final curing is carried out with a polyisocyanate, preferably an aromatic polyisocyanate. While the polyisocyanate employed in the final cure may, if desired, be the same or a different diisocyanate as compared with that used in the second stage, it may also be a tri- or higher functional isocyanate. One of the more attractive types of polyisocyanate useful in the fourth stage is the product:

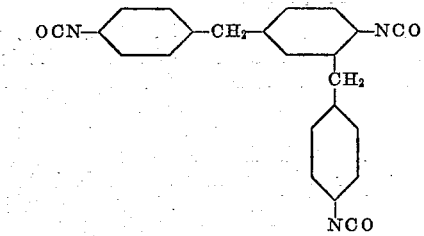

as well as the isomers thereof, obtainable by phosgenation of the reaction product of aniline and formaldehyde.

In the preferred embodiment of the invention, approximately 3 to 7% by weight, based on the weight of gum stock, of additional polyisocyanate is admixed with the gum stock on a conventional rubber mill or in any suitable mixing device and the mixture is cured in the mold at a temperature preferably of the order of about 140 to 160° C. in a few minutes. If a longer molding time than fifteen minutes is not objectionable, the temperature of the cure may be considerably lower, e.g., as low as about 100° C. In the mold the cure is accomplished apparently by a reaction of excess amino or hydroxyl groups with the newly admixed polyisocyanate, and secondly by reaction of the remaining free terminal isocyanate groups with hydrogen atoms of the urylene and urethane groups to form a strongly cross-linked polymer.

By this procedure, elastomers possessing excellent tensile strength, exceptional low brittle temperature and no perceptible hardening or crystallization are obtained. The very favorable non-hardening properties of the elastomers obtained in accordance with the method of this invention are not only apparent after extended storage but can be demonstrated by means of X-ray patterns of the elastomers stretched to 300 to 400% their original length. While elastomers prepared by other methods and from other starting materials show a tendency to crystallize, the elastomers prepared by the method of the invention show either virtually no crystallinity or not enough to cause hardening of the elastomeric composition.

Rigid polyurethane resins are also obtainable by employing oxyalkylene-carbooxyalkylene polymers, preferably of the block-type, having relatively short chain lengths, e.g., a molecular weight of about 400 to about 800, utilizing only unsubstituted lactones in their preparation, by using a considerable excess of isocyanate in the second stage, or by using a reactant having a higher functionality than two in the third stage, or any combination of these alternatives, all of which contribute to rigidity of the final product.

In reviewing the basic method of forming the resins of this invention, it will become apparent that, after preparation of the oxyalkylene-carbooxyalkylene polymers, the process can be carried out continuously with substantially simultaneous oxyalkylene-carbooxyalkylene extension and cross-linking, batchwise and in distinctly separate stages, or in any intermediate manner.

One continuous method that is most direct and economical and requires little more than continuous mixing apapratus as equipment involves admixing and reacting isocyanate with mixed but unreacted oxyalkylene-carbooxyalkylene polymers and polyfunctional reactant, the amount of isocyanate being such that the reactive isocyanate groups therein are present in approximately 10 to about 100% excess over the number of hydroxyl and amino groups in the oxyalkylene-carbooxyalkylene polymer and polyfunctional reactant. This method, which is illustrated in several of the examples to follow, leads immediately to the cured elastomer.

Another method involves reacting oxyalkylene-carbooxyalkylene polymers with about 1.2 to about 2 mols diisocyanate per mol of oxyalkylene-carbooxyalkylene polymer in the second stage for forming a prepolymer and then reacting the prepolymer with less than an equivalent amount, preferably about 10 to 75 mol percent, polyfunctional reactant. In this embodiment the excess of isocyanate-modified oxyalkylene-carbooxyalkylene polymers serves as a cross linking agent to form a completely cured resin.

It is also within the scope of the invention to admix and react an isocyanate with premixed but non-reacted oxyalkylene-carbooxyalkylene polymers and polyfunctional reactant, the number of reactive isocyanate groups in this instance being less than the number of hydroxyl and amino groups available for reaction on the oxyalkylene-carbooxyalkylene polymers and polyfunctional reactant. This is in effect a combination of the second and third stages for the preparation of the non-hardening gum stock and is followed by addition and reaction with an excess of additional isocyanate, preferably about 3 to 7%, in order to effect a cure. This embodiment, as well as the embodiment described in detail as most illustrative of the mechanism of the reactions involved, is desirable when it is desired to form a non-hardening gum stock that can be cured at a future date.

A considerable number of modifying agents may be added to the polyurethane resin at any stage of its production after the formation of the oxyalkylene-carbooxyalkylene polymer. These materials include fillers such as carbon blacks, various clays, zinc oxide, titanium dioxide, and the like; various dyes; plasticizers such as polyesters which do not contain any reactive end-groups, stearic and other fatty acids, organic esters of stearic and other fatty acids, metal salts of fatty acids, dioctyl phthalate, tetrabutylthiodisuccinate, and the like. It is also possible to include releasing agents such as mold release agents that are sometimes very helpful in the processing of the resin compositions. Among those useful for this purpose are films of "Teflon" or fluoroethene resins, silicone oils, fluorothene oils, polyethylene greases, paraffin waxes, petroleum jelly, "Carbowaxes," mineral oils, vegetable oils, and the like.

The advantages and utility of the method and product of the invention will become further apparent from the following detailed examples included for illustrative purposes only as showing the best modes now contemplated at present for carrying out the invention.

EXAMPLE 1

480 grams of a polyethylene glycol having a molecular weight of 960 and 570 grams (5 mols) epsiloncaprolactone were heated at 170° C. for twenty-four hours in the presence of one gram tetraisopropyl titanate as catalyst. The resulting mixture of block-type oxyalkylene-carbooxyalkylene polymers was a light brown waxy solid having a hydroxyl number of 57.7, a carboxyl number of 0.6 and a calculated average molecular weight of 1910.

150 grams of the block-type oxyalkylene-carbooxyalkylene polymers were heated to 120° C. and 31.3 grams (0.1185 mol) 3,3-dimethyl-4,4',diphenylene diisocyanate were added, whereupon the temperature rose to 130° C. After the mixture had cooled to 120° C., 2.9 grams ethanolamine were added and the reactants were stirred until an elastomeric gum product resulted. This was milled into a thin sheet on a rubber mill.

5% by weight of 3,3-dimethyl-4,4'-diphenylene diisocyanate was added to a portion of this gum stock on a cold rubber mill. The resulting material was molded into a disc of 0.07" thickness by heating under pressure for fifteen minutes at 160° C. The cured elastomer exhibited the following physical properties:

| | |
|---|---|
| Tensile strength, p.s.i. | 1550 |
| Elongation at break, percent | 550 |
| Load at 300% elongation, p.s.i. | 660 |
| Brittle temperature, ° C. | −72 |
| Hardness—Shore "A" | 55 |

EXAMPLE 2

213 grams of a polypropylene glycol having a molecular weight of 425 and 888 grams (7.8 mols) of epsilon-caprolactone were heated at 170° C. for two hours in the presence of 0.55 gram dibutyltin oxide. The resulting mixture of block-type oxyalkylene-carbooxyalkylene polymers was a waxy solid having a hydroxyl number of 44.3, a carboxyl number of 1.0 and a calculated average molecular weight of 2420.

150 grams of the block-type oxyalkylene-carbooxyalkylene polymers thus prepared were heated to 120° C. and 24.5 grams (.093 mol) 3,3-dimethyl-4,4'-diphenylene diisocyanate were added, whereupon the temperature rose to about 130° C. After the mixture had cooled to 120° C., 2.3 grams ethanolamine were added and the materials were stirred until an elastomeric gum stock resulted. This was milled into a thin sheet on a rubber mill.

7% by weight of 3,3-dimethyl-4,4'-diphenylene diisocyanate was added to a portion of this gum stock on a cold rubber mill. The resulting material was molded into a disc of 0.07" thickness by heating under pressure for thirty minutes at 160° C. The cured elastomer exhibited the following physical properties:

| | |
|---|---|
| Tensile strength, p.s.i. | 3700 |
| Elongation at break, percent | 510 |
| Load at 300% elongation, p.s.i. | 1625 |
| Brittle temperature, ° C. | below −76 |
| Hardness—Shore "A" | 82 |

EXAMPLE 3

500 grams of a polypropylene glycol having a molecular weight of 1025 and 600 grams (5.25 mols) of epsilon-caprolactone were heated at 170° C. for eighteen hours in the presence of 0.6 gram dibutyltin oxide. The resulting mixture of block-type oxyalkylene-carbooxyalkylene polymers was a waxy solid having a hydroxyl number of 48.8, a carboxyl number of 1.2 and a calculated average molecular weight of 2290.

150 grams of the block-type oxyalkylene-carbooxyalkylene polymers thus prepared were heated to 120° C. and 27 grams (1.02 mols) 3,3-dimethyl-4,4'-diphenylene diisocyanate were added, whereupon the temperature rose to about 130° C. After the mixture had cooled to 120° C., 2.5 grams ethanolamine were added and the materials were stirred until an elastomeric gum stock resulted. This was milled into a thin sheet on a rubber mill.

7% by weight of 3,3-dimethyl-4,4'-diphenylene diisocyanate was added to a portion of this gum stock on a cold rubber mill. The resulting material was molded into a disc of 0.07" thickness by heating under pressure for fifteen minutes at 160° C. The cured elastomer exhibited the following physical properties:

| | |
|---|---|
| Tensile strength, p.s.i. | 2750 |
| Elongation at break, percent | 660 |
| Load at 300% elongation, p.s.i. | 1200 |
| Brittle, temperature, ° C. | −56 |
| Hardness—Shore "A" | 68 |

EXAMPLE 4

912 grams (8 mols) epsilon-caprolactone and 2560 grams (80 mols) methanol were heated to 65 to 67° C. for twenty hours in the presence of 0.456 gram concentrated sulfuric acid (96%) as catalyst. The acid catalyst was then neutralized by addition of 0.505 gram sodium methylate and distilled in vacuo. 971 grams of methyl 6-hydroxycaproate were obtained. It had a boiling point of 99° C. at a pressure of 4 mm. Hg and a refractive index $n_D^{30}$ of 1.4349 to 1.4352.

877.2 grams (5 mols) of the methyl 6-hydroxycaproate thus obtained were heated to 60° C. with 2.08 grams boron trifluoride ethyl etherate (47% $BF_3$) and then 528 grams (12 mols) ethylene oxide were added over a period of three hours at a temperature of 60 to 70° C. The resulting ethylene oxide adduct was a colorless liquid having a refractive index $n_D^{30}$ of 1.4460.

550 grams of the ethylene oxide adduct, 31 grams (0.5 mol) ethylene glycol and 1.1 gram tetraisopropyl titanate were heated at 170° C. for twenty hours. 87.5 ml. of methanol were recovered. The reactants were then subjected to a vacuum of 10 mm. Hg for 3.5 hours at 170° C., 15 grams of ethylene glycol being recovered. The resulting mixture of oxyalkylene-carbooxyalkylene polymers was a light yellow viscous liquid having a hydroxyl number of 51.1, a carboxyl number of 1.0 and a calculated average molecular weight of 2120.

300 grams of the oxyalkylene-carbooxyalkylene polymers were heated to 120° C. with 56.1 grams (0.212 mol) 3,3-dimethyl-4,4'-diphenylene diisocyanate. The reaction temperature rose to 130° C. After the reactants had cooled to 120° C., 5.2 grams ethanolamine were added and the reactants were stirred vigorously until an elastomeric gum stock resulted. This was milled into a thin sheet on a rubber mill.

5% by weight of 3,3-dimethyl-4,4'-diphenylene diisocyanate was admixed with a portion of the gum stock on a cold rubber mill. The material was then molded into a disc of 0.07" thickness by heating under pressure for fifteen minutes at 160° C. The cured elastomer exhibited the following physical properties:

| | |
|---|---|
| Tensile strength, p.s.i. | 1935 |
| Elongation at break, percent | 780 |
| Load at 300% elongation, p.s.i. | 550 |
| Brittle temperature, ° C. | −64 |
| Hardness—Shore "A" | 54 |

EXAMPLE 5

550 grams of the ethylene oxide adduct of methyl 6-hydroxycaproate, prepared as described in Example 4, and 31 grams (0.5 mol) ethylene glycol were heated at 170° C. for twenty hours in the presence of 0.55 gram dibutyltin oxide and 0.5 gram tetraisopropyl titanate as catalysts. 80 ml. of methanol were recovered during this reaction. The reactants were then subjected to a vacuum of 10 mm. Hg for three hours during which time 15 grams of ethylene glycol were recovered. The resulting mixture of oxyalkylene-carbooxyalkylene polymers was a colorless viscous liquid having a hydroxyl number of 59.2, a carboxyl number of 1.3 and a calculated average molecular weight of 1820.

150 grams of the oxyalkylene-carbooxyalkylene polymers thus obtained were heated to 120° C. and 31.3 grams (0.1185 mol) 3,3-dimethyl-4,4'-diphenylene diisocyanate were added, whereupon the reaction temperature rose to 135° C. After the mixture had cooled at 120° C., 2.9 grams ethanolamine were added and the materials were stirred until an elastomeric gum stock resulted. This was milled into a thin sheet on a rubber mill.

7% by weight of 3,3-dimethyl-4,4'-diphenylene diisocyanate was added to a portion of this gum stock on a cold rubber mill. The mixture was molded into a disc of 0.07" thickness by heating under pressure for fifteen minutes at 160° C. The cured elastomer possessed the following physical properties:

| | |
|---|---|
| Tensile strength, p.s.i. | 1975 |
| Elongation at break, percent | 735 |
| Load at 300% elongation, p.s.i. | 1810 |
| Brittle temperature, ° C. | −52 |
| Hardness—Shore "A" | 65 |

EXAMPLE 6

300 grams of a polyethylene glycol having a molecular weight of 600, 800 grams of mixed methyl-epsilon-caprolactones, and 0.8 gram of dibutyltin oxide were heated at 170° C. under nitrogen for eighteen hours. The resulting mixture of oxyalkylene-carbooxyalkylene polymers had a hydroxyl number of 49.5 and a carboxyl number of 1.2.

200 grams of the above oxyalkylene-carbooxyalkylene polymers were mixed with 11.1 grams 4,4′-methylenedianiline and the mixture was heated to 120° C. A mixture of 65% 2,4- and 35% 2,6-tolylene diisocyanate (37.2 grams) was then added and the reactants were stirred for forty-five minutes. The elastomeric product thus obtained was collected. It cured to an elastomer of respectable strength on standing at room temperature for twenty-four hours.

EXAMPLE 7

1406 grams of epsilon-caprolactone, 79.5 grams of ethylene glycol and 3.3 grams of boron trifluoride ethyl etherate (47% $BF_3$) were heated to 60° C. 1406 grams of ethylene oxide were then fed to the reaction mixture over a period of 5.4 hours. On application of a vacuum of 4 mm. Hg, 81 grams of dioxane were removed. The remaining mixture of oxyalkylene-carbooxyalkylene polymers had a hydroxyl number of 52.5 and a carboxyl number of 1.3.

204 grams of the above oxyalkylene-carbooxyalkylene polymers and 11.0 grams of 4,4′-methylenedianiline were heated to 120° C. A mixture of 65% 2,4- and 35% 2,6-tolylene diisocyanate (33.0 grams) was then added and the reactants were stirred for forty-five minutes. After further curing at room temperature for twenty-four hours, a tough elastomeric product resulted.

It is to be expected that numerous modifications will readily occur to those skilled in the art upon reading this description. All such modifications are intended to be included within the scope of the invention as defined in the appended claims.

We claim:

1. Method which comprises the steps of (I) simultaneously reacting, at a temperature between about 10 and 200° C., (a) a lactone having at least four carbon atoms in the ring with (b) a difunctional compound of the group consisting of dihydric alcohols, diphenols, dimercaptans, mercapto alcohols, water and hydrogen sulfide, and (c) a monomeric vicinal epoxide, the proportions of said reactants being such as to form a mixture of linear polyesters having terminal hydroxyl groups and molecular weights int he range of about 400 to about 10,000; (II) reacting said mixture of linear polyesters with a 30 to 60% molar excess of organic diisocyanate at a temperature up to about 300° C. to form a mixture of substantially linear polyester-polyurethane diisocyanates; and (III) reacting said mixture of linear polyester-polyurethane diisocyanates with an amount of a polyfunctional compound in excess of that required for reacting with all of the isocyanate groups of the said mixture of linear polyester-polyurethane diisocyanates, said polyfunctional compound being selected from the group consisting of water and organic compounds having at least two reactive sites selected from the group consisting of alcoholic hydroxyl, primary amino, secondary amino, and carboxyl groups to form a non-hardening gum stock.

2. Method as defined in claim 1 wherein the lactone is an epsilon-caprolactone.

3. Method as defined in claim 1 wherein the organic bifunctional initiator is a dihydric alcohol.

4. Method as defined in claim 1 wherein the reaction of a lactone, a dihydric alcohol and an epoxide is carried out simultaneously and in the presence of a Lewis acid catalyst.

5. Method as defined in claim 1 wherein the reaction of the mixture of linear polyesters with organic diisocyanate is carried out at about 100 to 150° C.

6. Method as defined in claim 1 wherein the said mixture of linear polyester-polyurethane diisocyanates is reacted with a 1 to 20% molar excess of polyfunctional compound at a temperature up to about 200° C.

7. Method as defined in claim 1 wherein the said mixture of linear polyester-polyurethane diisocyanates is reacted with a 1 to 20% molar excess of polyfunctional compound at a temperature of about 100 to 150° C.

8. The method of claim 1 in which the non-hardening gum stock is cured by reacting it, at a temperature of at least about 100° C., with about 3 to 7% by weight of an organic polyisocyanate based on the weight of said gum stock.

9. The method of claim 1 in which the non-hardening gum stock is cured by reacting it, at a temperature of about 140 to 160° C., with about 3 to 7% by weight of an organic polyisocyanate based on the weight of said gum stock.

10. Method for forming a cured elastomeric polyurethane resin which comprises reacting, at a temperature between about 10 and 200° C., (1) a mixture of linear polyesters prepared by simultaneously reacting (a) a lactone having at least four carbon atoms in the lactone ring with (b) a difunctional compound of the group consisting of dihydric alcohols, diphenols, dimercaptans, mercapto alcohols, water and hydrogen sulfide, and (c) a monomeric vicinal epoxide, the proportions of said reactants being such as to form said mixture of linear polyesters having terminal hydroxyl groups and molecular weights in the range of about 400 to about 10,000, (2) an organic diisocyanate, and (3) a polyfunctional reactant selected from the group consisting of water and organic compounds having at least two reactive sites selected from the group consisting of alcoholic hydroxyl, primary amino, secondary amino and carboxyl groups, the amount of said organic diisocyanate being so selected as to provide a 10 to 100% excess of reactive isocyanate groups over the number of hydroxyl and amino groups in the mixture of polyesters and said polyfunctional reactant.

11. Method for forming a non-hardening gum stock which comprises reacting (1) a mixture of linear polyesters prepared by (a) reacting a lactone having at least four carbon atoms in the ring with a molar excess of a monohydric alcohol at a temperature of about 60 to 100° C. to form a hydroxyl ester, (b) removing excess monohydric alcohol from the reaction product, (c) subsequently reacting said hydroxy ester with a monomeric vicinal epoxide at a temperature up to about 150° C. to form extended hydroxy esters containing ether groups, and (d) polymerizing said extended esters by reaction with an excess of chain stopper of the group consisting of dihydric alcohols, diamines and amino alcohols having a boiling point higher than that of the said monohydric alcohol at a temperature of about 120 to 250° C. to form said mixture of linear polyesters having terminal hydroxyl groups and molecular weights in the range of about 400 to about 10,000, (2) an organic diisocyanate, and (3) a polyfunctional reactant selected from the group consisting of water and organic compounds having at least two reactive sites selected from the group consisting of alcoholic hydroxyl, primary amino, secondary amino and carboxyl groups, the amount of said organic diisocyanate being so selected as to provide a 10 to 100% excess of reactive isocyanate groups over the number of hydroxyl and amino groups in the mixture of polyesters and said polyfunctional reactant.

12. A product prepared as defined in claim 1.
13. A product prepared as defined in claim 2.
14. A product prepared as defined in claim 3.
15. A product prepared as defined in claim 4.
16. A product prepared as defined in claim 5.
17. A product prepared as defined in claim 6.
18. A product prepared as defined in claim 7.
19. A product prepared as defined in claim 8.
20. A product prepared as defined in claim 9.
21. A product prepared as defined in claim 10.
22. A product prepared as defined in claim 11.

References Cited in the file of this patent

UNITED STATES PATENTS

| | | |
|---|---|---|
| 2,389,628 | Martin | Nov. 27, 1945 |
| 2,432,148 | Furness et al. | Dec. 9, 1947 |
| 2,621,166 | Schmidt et al. | Dec. 9, 1952 |
| 2,729,618 | Muller et al. | Jan. 3, 1956 |
| 2,848,441 | Reynolds et al. | Aug. 19, 1958 |
| 2,853,474 | Reynolds et al. | Sept. 23, 1958 |
| 2,933,477 | Hostettler | Apr. 19, 1960 |
| 2,933,478 | Young et al. | Apr. 19, 1960 |

FOREIGN PATENTS

| | | |
|---|---|---|
| 956,245 | France | July 25, 1949 |
| 861,609 | Germany | Jan. 5, 1953 |
| 869,867 | Germany | Mar. 9, 1953 |

OTHER REFERENCES

Ser. No. 397,741, Schlact (A.P.C.), published Apr. 20, 1943.